E. ROSENBERGER.
TRANSMISSION GEAR FOR AUTOMOBILES.
APPLICATION FILED JAN. 8, 1916.
1,200,873.
Patented Oct. 10, 1916.
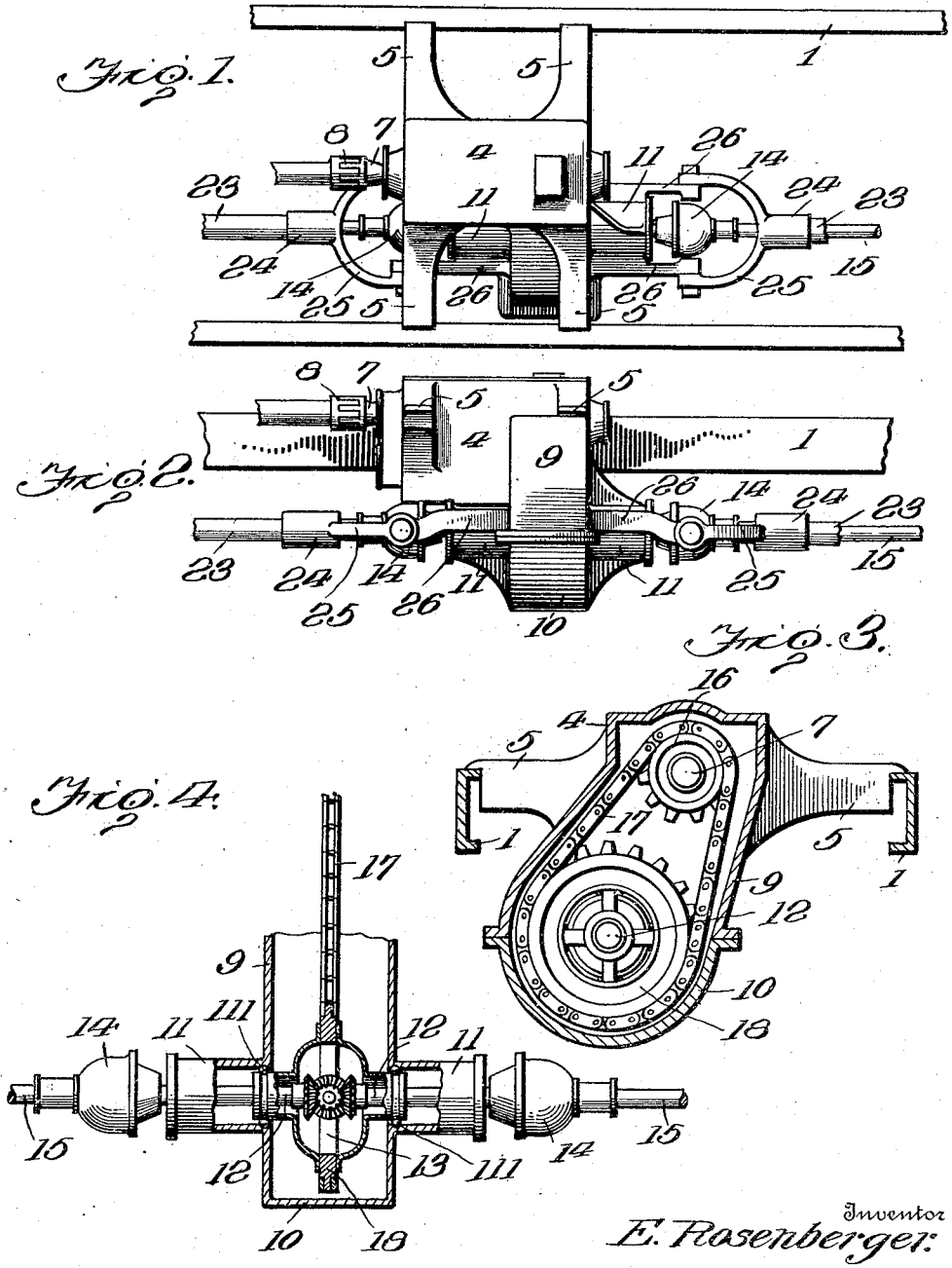
Inventor
E. Rosenberger:
By
[signature], Attorneys

UNITED STATES PATENT OFFICE.

ERNST ROSENBERGER, OF MANKATO, MINNESOTA.

TRANSMISSION-GEAR FOR AUTOMOBILES.

1,200,873.
Specification of Letters Patent. Patented Oct. 10, 1916.

Original application filed January 7, 1915, Serial No. 999. Divided and this application filed January 8, 1916. Serial No. 71,028.

*To all whom it may concern:*

Be it known that I, ERNST ROSENBERGER, a citizen of the United States, residing at Mankato, in the county of Blue Earth and State of Minnesota, have invented certain new and useful Improvements in Transmission-Gears for Automobiles, of which the following is a specification.

This invention relates to transmission gearing for automobiles, the present application being a division of an application filed by me January 7, 1915, Serial No. 999.

The particular object of the invention herein set forth is the provision of simple means for connecting the driving shaft with the shafts for transmitting motion to the ground wheels whereby great flexibility will be imparted to the mechanism so that it will be operative while traveling over very rough roads without subjecting the motor to excessive strain.

The invention is illustrated in the accompanying drawings in which:—

Figure 1 is a plan view; and Fig. 2 is a side view showing the application of the invention to an automobile; Fig. 3 is a vertical transverse section; Fig. 4 is a detail longitudinal section.

In the drawings, 1 indicates a portion of an automobile frame upon which the transmission gear case 4 is mounted and 7 designates the transmission shaft which is mounted longitudinally in said gear case and connected by a coupling 8 with the power shaft.

As shown most clearly in Fig. 3, the gear case 4 is constructed in two parts which are provided with flanges at their meeting edges through which bolts or other fastenings are inserted to secure the two parts together.

The upper part or member of this case is provided with lateral arms 5 which are secured in any desired manner directly to the frame 1 and has a depending tubular portion to the lower end of which the lower sleeves 11 are se- 7 within the gear case 4 and a chain 17 is trained around the sprocket wheel and a larger sprocket wheel 18 which is housed within the lower portion of the gear case and forms the central member of the differential gear 13. By this arrangement, motion is transmitted from the power shaft of the engine through the shaft 7 and the sprocket gearing to the differential gear b which it is imparted directly to the long tudinal shafts 15. At the inner ends of sleeves 11, I provide ball bearings 111 the differential gearing whereby said g ing is retained in its proper position. master gears of the differential are vided with angular sockets in their h receive the angular ends of the sha said shafts being inserted through posite sides of the casing, as will be understood. The universal joints 1 cured to the outer ends of the shaft roller bearings for said shafts ma vided at the outer ends of the slee The shafts 15 extend through to the front and rear axle and a the same so as to impart mot thereto and thereby propel the their inner ends, these shafts fitted in sleeves 24 to which secured and which are carrie pivoted to arms or brackets from the gear case. This ar the several shafts in longit while, at the same time, it readily accommodate then ness in the surface over w traveling. It will also moving members of the closed so as to be protec dirt and may run in oughly lubricated w sprocket chain to the upper shaft to t great flexibility to t Having thus descr is claimed as new i The combination ing mounted there ing tubular porti ing bearings projecting from the lower portion of the casing, pinions on the inner ends of said shafts, a hollow sprocket wheel journaled in the walls of said casing, a sprocket pinion on the driving shaft in the upper portion of the casing, a sprocket chain connecting the said sprocket pinion and said hollow sprocket wheel, and pinions carried internally by the hollow sprocket wheel and meshing with the opposed pinions on said alined shafts.

In testimony whereof, I affix my signature.

ERNST ROSENBERGER. [L. S.]

"Copies of this patent may be obtained for five cents each, by addressing the "Commissioner of Patents, Washington, D. C.""